United States Patent
Naohiro (10) Patent No.: US 6,317,414 B1
(45) Date of Patent: Nov. 13, 2001

(54) SIGNAL SWITCHING METHOD

(75) Inventor: Shimada Naohiro, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/016,305

(22) Filed: Jan. 30, 1998

(30) Foreign Application Priority Data

Jan. 31, 1997 (JP) .................................................. 9-019390

(51) Int. Cl.$^7$ ............................. H04L 12/16; H04J 1/16; H04Q 11/00; H04B 10/08; H04B 10/00
(52) U.S. Cl. ..................... 370/222; 370/226; 370/228; 370/357; 370/535; 359/110; 359/161
(58) Field of Search .................... 370/222, 226, 370/228, 243, 216, 217, 219, 220, 357, 535, 360, 375, 376, 358, 536; 359/110, 161, 119, 166

(56) References Cited

U.S. PATENT DOCUMENTS

| | | | |
|---|---|---|---|
| 5,311,501 | * | 5/1994 | Takatsu .................................. 370/16 |
| 5,327,275 | * | 7/1994 | Yamane et al. ...................... 359/117 |
| 5,532,862 | * | 7/1996 | Tada et al. ............................. 359/161 |
| 5,574,717 | * | 11/1996 | Tomizawa et al. ..................... 370/13 |
| 5,663,949 | * | 5/1998 | Ishibashi et al. ..................... 370/220 |
| 5,717,796 | * | 2/1998 | Clendening ............................ 385/24 |
| 5,740,157 | * | 4/1998 | Demiray et al. ...................... 370/219 |
| 5,745,476 | * | 4/1998 | Chaudhuri ............................. 370/222 |
| 5,754,545 | * | 5/1998 | Shinbashi et al. .................... 370/360 |
| 5,978,354 | * | 11/1999 | Taketomi et al. ..................... 370/226 |

FOREIGN PATENT DOCUMENTS

| | | |
|---|---|---|
| 669944 | 3/1994 | (JP) . |
| 6132920 | 5/1994 | (JP) . |
| 730571 | 1/1995 | (JP) . |
| 7154409 | 6/1995 | (JP) . |

* cited by examiner

*Primary Examiner*—Wellington Chin
*Assistant Examiner*—M. Phan
(74) *Attorney, Agent, or Firm*—Sughrue, Mion, Zinn, Mapceak & Seas, PLLC (57) ABSTRACT

The present invention relates to a signal switching method and apparatus for dividing signals to be switched into a plurality of divided signals and outputting the divided signals at a transmittal terminal, receiving the plurality of divided signals as a plurality of receiving signals at a reception terminal, and executing a switching to a signal closer to normality out of the plurality of receiving signals, wherein with respect to a through signal not to be dropped, the through signal is processed in a closed manner within one package or LSI, only a signal to be dropped is transferred to a package or LSI on a dropped side, the switching is executed, and with respect to a signal to be added, at a backboard a signal from a package or LSI on a added side is divided and sent to another route.

18 Claims, 9 Drawing Sheets

SIGNAL SWITCHING METHOD

BACKGROUND OF THE INVENTION

The present invention relates to a signal switching method and apparatus, and more particularly to a signal switching method and apparatus capable of executing a protection switching to a signal closer to normality by dividing signals to be switched at a transmittal terminal and comparing the divided signals with each other at a reception terminal.

Conventionally, such a type of art was proposed as one technique for restoring a failure in case that topology of a network is a ring in a STM (Synchronous Transfer Mode) system such as a SONET (Synchronous Optical Network) (SONET PPS Self-healing Ring (TA-NWT-001400 Issued on Apr. 1, 1993, Bellcore), SONET Dual-Fed Unidirectional Path Switched Ring (UPSR) Equipment Generic Criteria (GR-1400-CORE Issued on Mar. 1, 1994, Bellcore)). Also, in this technique, the relation between bands in current use and spare use was that the spares always have one band whenever there was one band for the current use. In other words, the failure was restored by making entirely the same signals exist for the current use and the spares concurrently and switching the signal in the current use to one in the spares on a reception side when some failure occurred in the current use.

Figure 10:
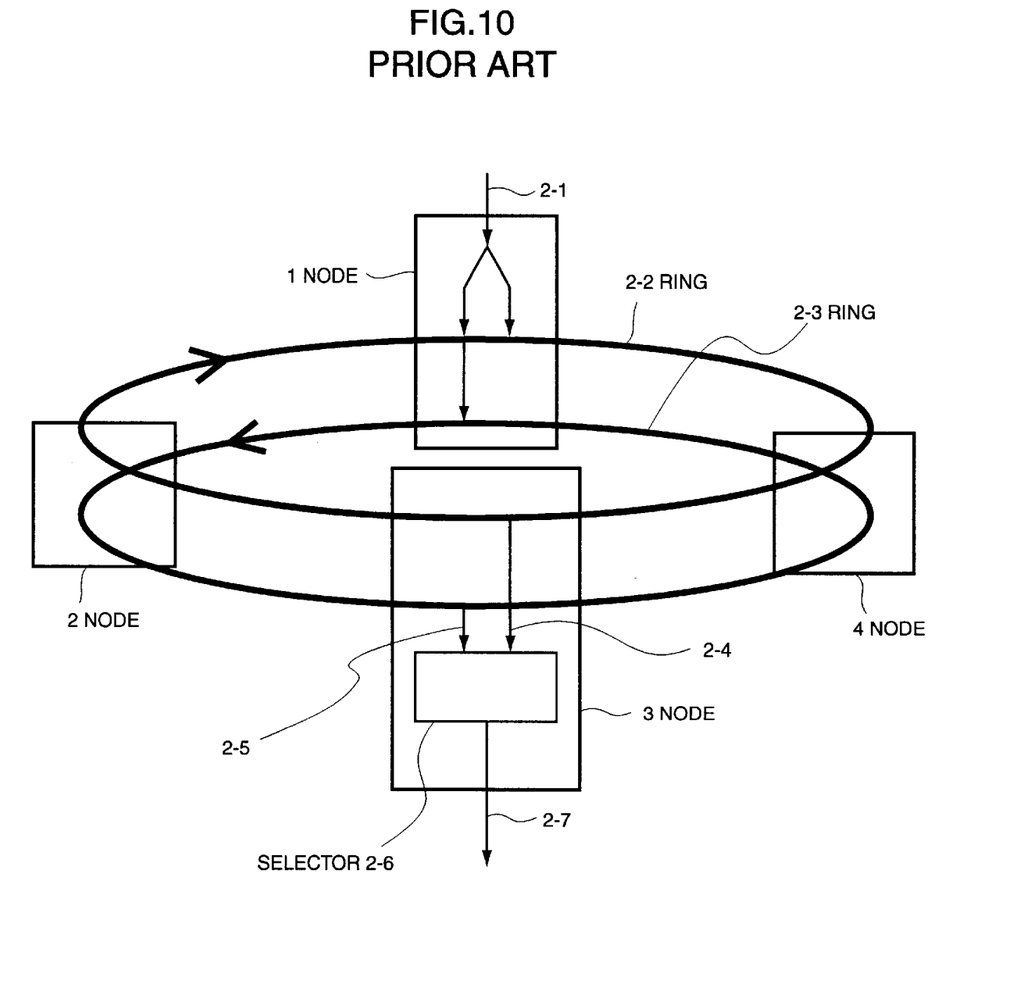
FIG. 10 is a block diagram showing a conception of a UPSR.

FIG. 10 shows the conception of the prior art. A case is considered here that a signal 2-1 to be input from a node 1 is transmitted to a node 3. In this case, the signal 2-1 to be transmitted diverges (is bridged) at the node 1 and the divergence signals are added and sent to rings 2-2 and 2-3 in opposite directions. At a node 3, in turn, signals 2-4 and 2-5 are dropped from the signals flowing through the rings 2-2 and 2-3, which are transmitted via different routes, respectively, and the dropped signals are compared with each other at a selector (a two to one selector) 2-6 to select a signal closer to normality as selected signal 2-7, resulting in restoring a failure.

Figure 11:
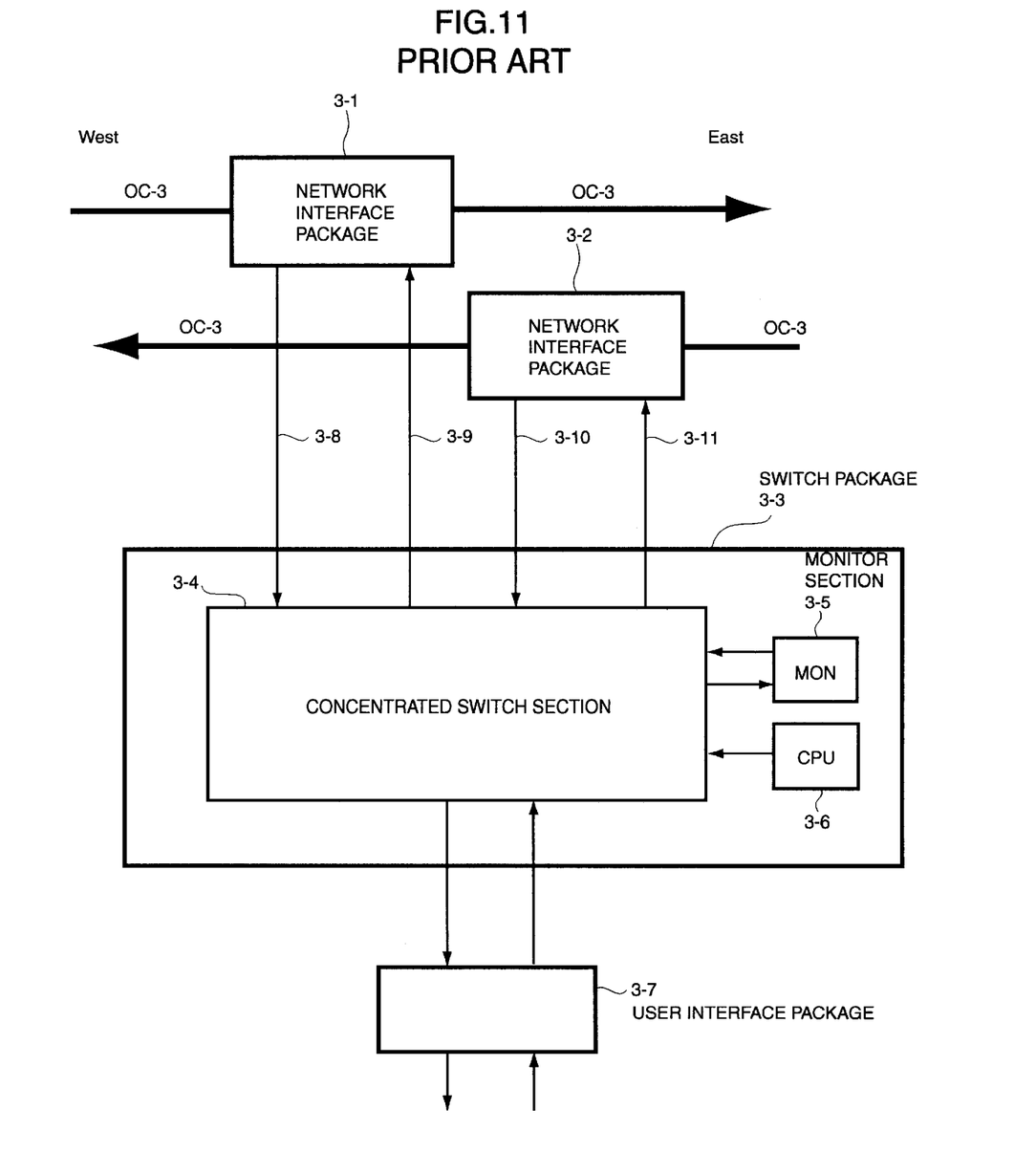
FIG. 11 is a block diagram showing an example of a conventional switching method.

As a concrete method for implementing the prior art, there was a method of collectively dealing with entire transmittal data by one switch in order to select a correct signal by the Pass-Protection-Switch (PPS). FIG. 11 illustrates this method. In FIG. 11, the same signals 3-8 and 3-10 transmitted through different routes, respectively, from signals OC-3 (Optical Carrier-Level 3) flowing through two rings are dropped into network interface packages 3-1 and 3-2, and in order to compare the two signals 3-8 and 3-10 with each other, the signals 3-8 and 3-10 are input to a concentrated switch portion 3-4 of a switch package 3-3 from the network interface packages 3-1 and 3-2. A monitor portion (MON) 3-5 monitors normality of the two signals 3-8 and 3-10 input to the concentrated switch portion 3-4 and supplies a monitoring result to the concentrated switch portion 3-4. Under control of a CPU 3-6, the concentrated switch portion 3-4 collectively switches and controls the signals 3-8 and 3-10 and provides a user interface package 3-7 with a signal having high normality out of the two signals 3-8 and 3-10. In addition, reference numerals denote signals that are output from a subordinate portion of the concentrated switch portion 3-4 and added to the signals flowing through the two rings.

Figure 12:
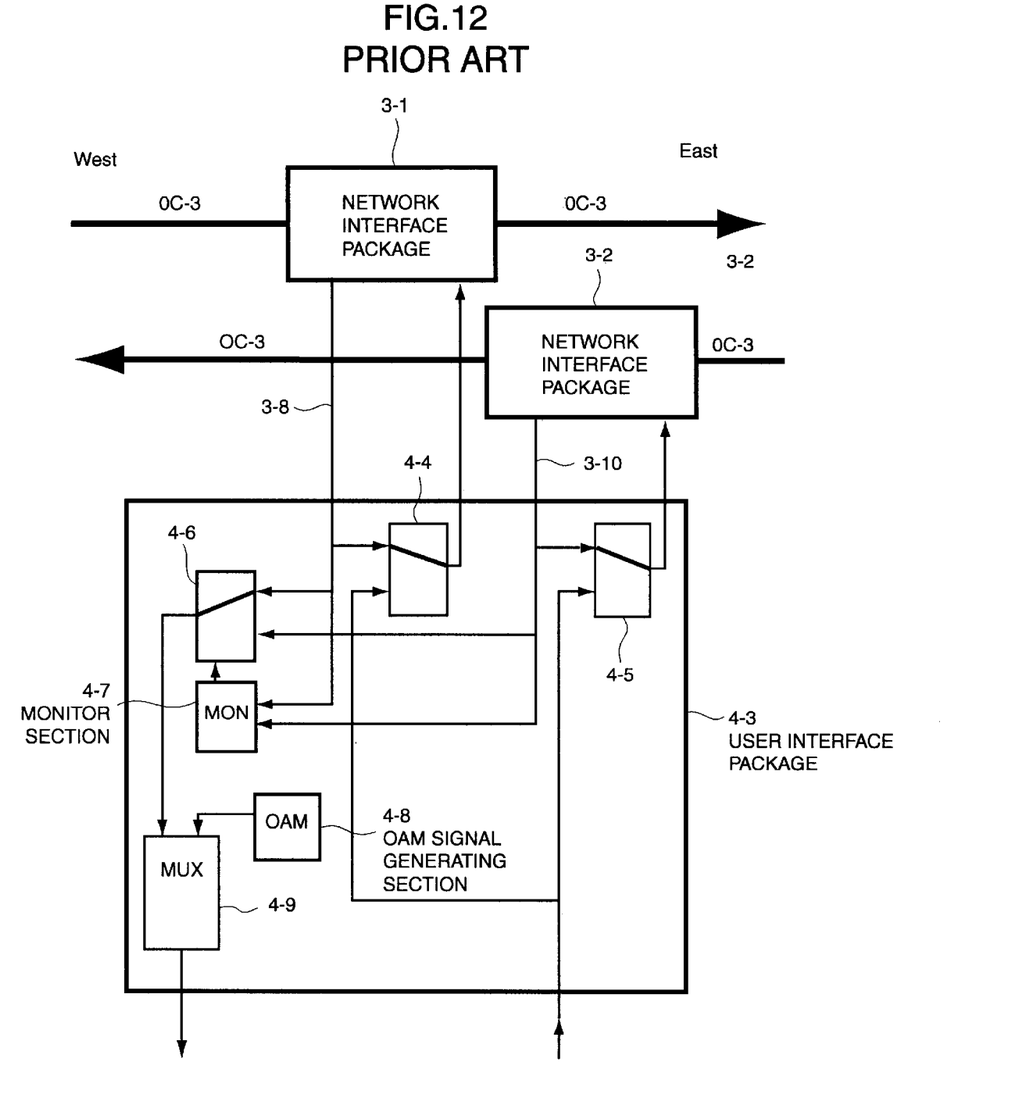
FIG. 12 is a block diagram showing another example of a conventional switching method.

Also, as another method, as shown in FIG. 12, there was a method of executing a switching by dropping the same signals 3-8 and 3-10 transmitted through different routes, respectively, from signals OC-3 (Optical Carrier-Level 3) flowing through two rings into user interface package 4-3, and selecting a signal closer to normality out of the signals 3-8 and 3-10 in a switch portion 4-6 included in the user interface package 4-3 as a selected signal (JP-A-107425/1996 shall be referred to). This user interface package 4-3 further has a monitor section (MON) 4-7 for monitoring normality of the signals 3-8 and 3-10, an OAM signal generating section 4-8 for generating an OAM (Operation, Administration and Maintenance) signal to a subordinate device (user interface) side, an OAM inserting portion (MUX) 4-9 for inserting the OAM signal into the selected signal, a selection portion 4-4 for selecting whether a signal from a West side passes through and goes to an East side or a signal from the subordinate device side is added to a signal from the West side, and a selection portion 4-5 for selecting whether a signal from the East side passes through and goes to the West side or a signal from the subordinate device side is added to a signal from the East side.

Any method of these is a technique wherein, as mentioned above, a network of the STM representative of the SONET is formed of rings and one signal is selected from two signals in the current use and the spares.

In JP-A-132920/1994, a switching circuit for a transmittal device having redundant construction is proposed for the purpose of, even though a failure occurs in a unit switching device, preventing signals from both of units from colliding with each other or preventing a signal from not being output from any unit, and the switching circuit has means for outputting a signal indicative of operating condition of its unit to each of other units and means for, to the contrary, inputting a signal indicative of operating condition of other units, and is for executing a switching of units for current use and spare use based on these signals indicative of the operating condition.

In JP-A-30571/1995, an interlocking device is proposed for the purpose of, in a self-healing ring, making the extension of a network thereof, wherein the whole network can be made to a self-healing system by applying a route diversity mechanism to parts interlocked to a ring network.

In JP-A-69944/1994, a drop/insert multiplexing tributary station device for a ring-shaped transmittal line is proposed, wherein in case that a failure occurs in the ring-shaped transmittal line, reliability of each channel is improved by enabling a digital signal to go round transmittal in an opposite direction per channel unit in which the digital signal is converted into a voice-band signal.

In JP-A-154409/1995, an AIS (Alarm Indication Signal) insertion and removal system for inserting the AIS into a accident relief ring N/W and a drop path at each node thereof is proposed, which is implemented by positively dealing with nothing particular when detecting the AIS on an upstream side of a signal for the purpose of shortening an AIS insertion time to a downstream side.

As explained above, the prior arts are proposed as a method or system for restoring a failure in case that a topology of a network is a ring in an STM system such as a SONET, and thus, a fine switching per ATM (Asynchronous Transfer Mode) layer, for example, as the unit of a VP (Virtual Path) and a VC (Virtual Channel) cannot be executed in the prior arts, and since a topology other than a ring topology is not taken into account, the prior arts cannot be applied to a mesh topology.

Also, in this method or system, since the relation between bands in current use and spare use was that the spares always have one band whenever there was one band in the current use, there is a problem that adaptation to a wide switching method such as protection for m (m is integers equal to or more than two) spares to n (n is integers equal to or more than two) of the current use has not been taken into account.

Also, as a concrete implementation method, conventionally, in order to select a correct signal by means of a path protection switch (referred to as PPS, hereinafter), whole transmittal data were input to one switch and switched by a CPU processing collectively. In this method, there are problems that in case that a lot of control commands of a switching occur concurrently, a bottleneck of the CPU processing spends much time and that reliability becomes to be extremely lowered due to the necessity of a switch having a complicated circuit.

Also, in the aforementioned JP-A-107425/1996, a switching method was proposed in which the switching is executed by a switch for selecting one signal of two signals. However, there is room for improving the method in order to implement it at a low price and compactly.

SUMMARY OF THE INVENTION

The objective of the present invention is to solve the above-mentioned tasks.

The objective of the present invention is to make a fine switching, for example, as the unit of a VP and VC possible and to be adapted to a topology such as a mesh topology, other than a ring topology. In other words, the objective of the present invention is to make protection at an ATM layer possible by executing the switching of the VP and VC, resulting in realizing effective utilization of the current spare band using a statistical multiplexing effect that is characteristic of the ATM.

Although conventionally there is a method in which a band is used twice as many so that a spare band is to be one for one band in current use, the objective of the present invention is to efficiently utilize the band in addition to the use of the conventional method.

The objective of the present invention is to provide a protection method and apparatus capable of being in wide use while taking account of the accommodation thereof to a mesh topology without limiting the accommodation to a ring topology.

For this, the objective of the present invention is to take account of accommodation to a wide switching method, for example, to take account of the protection of spare bands m for bands n in current use.

The objective of the present invention is to make various accommodation thereof possible, in which, beginning with the conventional method wherein the number and bands in current use are entirely the same as those in spares, respectively, the number and the bands in the current use are more than those in the spares and, to the contrary, the number and the band in the spares are more than those in the current use.

Also, the objective of the present invention is to avoid problems that in case that a lot of control commands of a switch occur concurrently, it takes much time to execute a switching and that reliability becomes to be extremely lowered due to the necessity of a switch having a complicated circuit, and to execute a faster switching by a cheaper and compact implementation means, resulting in realizing high reliability.

In accordance with the present invention, a signal switching method and apparatus are provided. The method and apparatus are configured to divide signals to be switched into a plurality of divided signals and output the divided signals at a transmittal terminal, to receive the plurality of divided signals as a plurality of receiving signals at a reception terminal, and to execute a switching to a signal closer to normality out of the plurality of receiving signals. The method and apparatus are configured to, with respect to a through signal not to be dropped, process the signal in a closed manner within one package or LSI, and only with respect to a signal to be dropped, to transfer the signal to a package or LSI on a dropped side and execute the switching.

In accordance with the present invention, a signal switching method and apparatus are provided. The method and apparatus are configured to divide signals to be switched into a plurality of divided signals and output the divided signals at a transmittal terminal, to receive the plurality of divided signals as a plurality of receiving signals at a reception terminal, and to execute a switching to a signal closer to normality out of the plurality of receiving signals. The method and apparatus are configured to, with respect to a signal to be added, divide at a backboard a signal from a package or LSI on a added side, and to send the divided signal to another route.

In accordance with the present invention, a signal switching method and apparatus are provided. The method and apparatus are configured to divide signals to be switched into a plurality of divided signals and output the divided signals at a transmittal terminal, to receive the plurality of divided signals as a plurality of receiving signals at a reception terminal, and to execute a switching to a signal closer to normality out of the plurality of receiving signals. The method and apparatus are configured to apply a multiplexing to the receiving signals at the reception terminal, and to input the multiplexed signals into a package or LSI for the switching.

In accordance with the present invention, a signal switching method and apparatus are provided. The method and apparatus are configured to execute a switching to a spare route from a plurality of routes in current use into which a plurality of signals in current use are input. The plurality of signals in current use are obtained by dividing input signals, and the number or band of the spare route is less than that of the plurality of routes in current use. In the method and apparatus, a switching of the signals in current use is executed in order of switching requirements of the plurality of routes in current use.

In accordance with the present invention, a signal switching method and apparatus are provided. The method and apparatus are configured to execute a switching to a spare route from a plurality of routes in current use into which a plurality of signals in current use are input. The plurality of signals in current use are obtained by dividing input signals, and the number or band of the spare route is less than that of the plurality of routes in current use. In the method and apparatus, a switching of the signals in the plurality of routes in current use to the spare route is executed based on preset priority.

In accordance with the present invention, a signal switching method and apparatus are provided. The method and apparatus are configured to execute a switching to a spare route from a plurality of routes in current use in an ATM network, into which a plurality of signals in current use are input. The plurality of signals in current use are obtained by dividing input signals, and the number or band of the spare route is less than that of the plurality of routes in current use. The method and apparatus are configured to allocate the routes of in current use to be switched to bands within a band of the spare route to be provided, and to share the bands.

In accordance with the present invention, a signal switching method and apparatus are provided. The method and apparatus are configured to execute a switching to a spare route from a plurality of routes in current use in an ATM network, into which a plurality of signals in current use are input. The plurality of signals in current use are obtained by dividing input signals, and the number or band of the spare route is less than that of the plurality of routes in current use. The method and apparatus are configured to apply a statistical multiplexing to the plurality of signals in current use and input the multiplexed signals to one of the plurality of routes in current use, and to switch the one of the routes in current use to the spare route.

In accordance with the present invention, a signal switching method and apparatus are provided. The method and apparatus are configured to execute a switching to a spare route from a plurality of routes in current use in an ATM network, into which a plurality of signals in current use are input. The plurality of signals in current use are obtained by dividing input signals, and the number or band of the spare route is less than that of the plurality of routes in current use. The method and apparatus are configured to apply a statistical multiplexing to the plurality of signals in current use, and to input the multiplexed signals to the spare route.

BRIEF DESCRIPTION OF THE DRAWINGS

This and other objects, features and advantages of the present invention will become more apparent upon a reading of the following detailed description and drawings, in which.

DESCRIPTION OF THE EMBODIMENTS

The present invention will be explained by referring to the drawings.

First, a method in accordance with the present invention will be described, in which problems are avoided that in case that a lot of control commands of a switch occur concurrently, it takes much time to execute a switching and that reliability becomes to be extremely lowered due to the necessity of a switch having a complicated circuit, and also, a method and apparatus in accordance with the present invention will be described, in which a faster switching is executed by a cheaper and compact implementation means, resulting in realizing high reliability.

Generally, in an arrangement of a ring topology, usually, a band of a signal to be added or dropped at each node is less than that of a signal that passes through a node without being added or dropped. Accordingly, (1) It is preferable for a signal passing through a node without being added or dropped that a signal processing is being closed within a physical processing medium such as a package and an LSI, and a removal of unnecessary exchange of signals with other LSI's and packages makes efficiency to be improved. Thereby, the number of pins or a wiring of a backboard can be saved, resulting in achieving low cost performance of an apparatus and preventing occurrence of unnecessary noise.

(2) Each channel package prepared for an addition or drop of a signal is provided with a function for comparing two signals of a signal in current use and a spare signal or signals more than two with each other and selecting one signal. In this way, since each channel package has only a function for independently monitoring the two signals or more than two individual signals and selecting one signal from them, the apparatus can be easily implemented by a hardware logic, resulting in making the apparatus compact. Since this makes each channel package have a selecting function in an autonomous distributed manner, a fast switching can be executed regardless of the number of objects to be switched. Simplification of a circuit makes an apparatus with high reliability to be realized, in addition to promoting low cost performance.

In a conventional UPSR adapted to a ring topology, with respect to objects to be compared with in a switching, it is assumed that for one in current use, the spares are also one. However, in taking a mesh topology into account, it can be considered that for one in current use, there are a plurality of spares. In this case, on a reception side, a selection means, not a selector for selecting one of two signals, is disposed for comparing more than three signals of candidates in parallel with each other and selecting a signal that operates most normally. Thereby, a switching method or apparatus capable of being also adapted to the mesh topology can be implemented and more high reliability can be realized.

Figure 1:
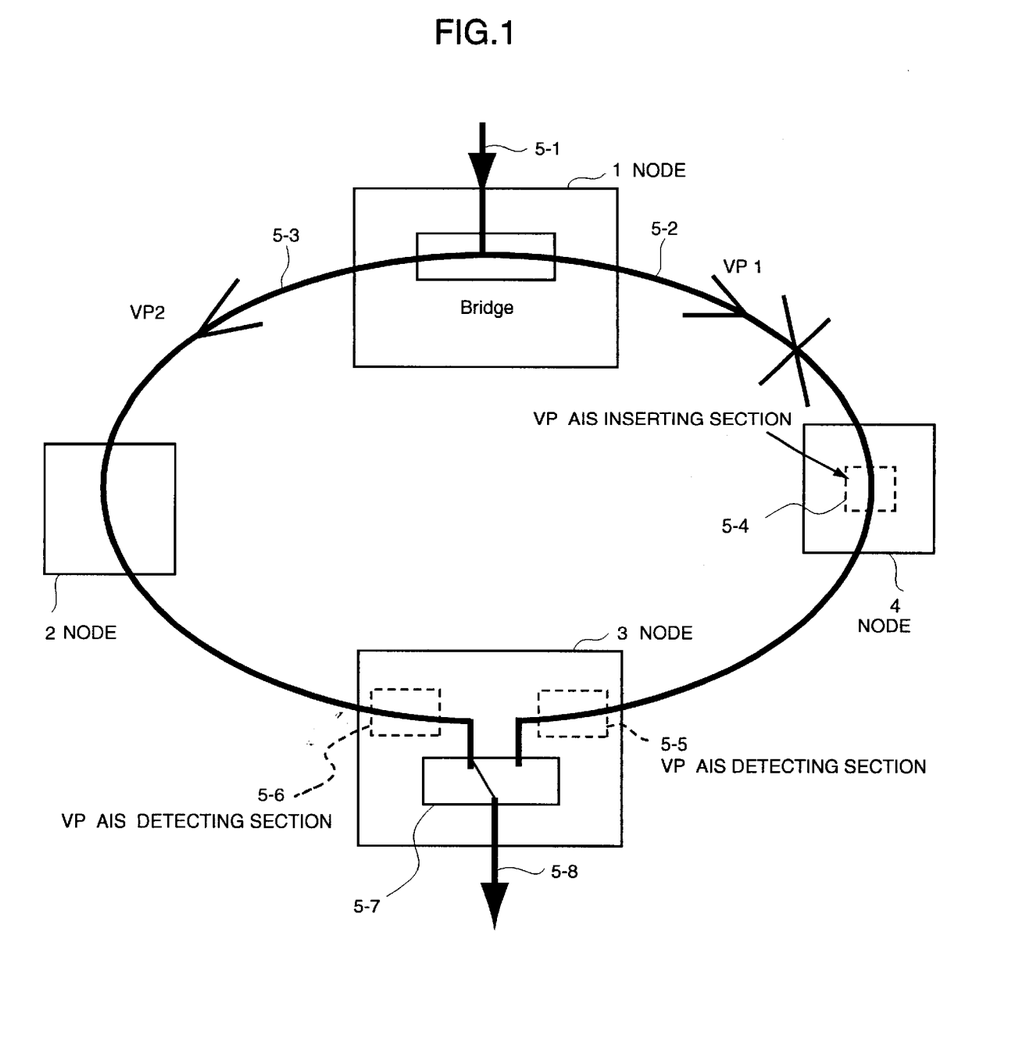
FIG. 1 is a block diagram illustrating a principle of the present invention.

Also, in the present invention, in order to make a fine switching per unit of a VP and VC possible, protection at an ATM layer is conducted. FIG. 1 shows a principle of the present invention, in which a method shown in FIG. 10 is used in an ATM system, not in an STM system. FIG. 1 also shows a case in which a signal 5-1 to be input from a node 1 is transmitted to a node 3. At the node 1, the signal 5-1 is distributed to a VP1(5-2) and a VP2(5-3). Here, if some failure occurs between the node 1 and a node 4 and the VP1 is damaged, a VP Alarm Indicating Signal AIS is inserted into the VP1 at a VP AIS inserting portion 5-4 in the node 4, for example. VP AID detecting portions 5-5 and 5-6 at the node 3 of destination of the transmission monitor normality of the VP1 and VP2 input through different routes. In this case, the VP AIS detecting portion 5-5 detects the VP AIS of the VP1 and a VP switch (2 to 1 selector) 5-7 selects the VP1, the VP switch 5-7 is automatically switched to the VP2 in accordance with the detection of the VP AIS at the VP AIS detecting portion 5-5.

In the present invention, as a method of conducting the protection at the ATM layer having a unit of this VP or VC, a notification means is disposed for notifying a failure or a switching at a VP or VC level using a user cell or an OAM cell. Also, on the execution of the switching, a switch is equipped so as to execute the switching per VP unit or VC unit. Further, by statistically multiplexing signals on a side in current use or signals on a spare side, restricted sources in current use and spare use become to be efficiently utilized. Particularly, by using a method in which a restricted band of the spares is shared with a plurality of bands in current use and utilized, the spare band that is not usually used can be used efficiently. Although conventionally, there was a method, for example, in which bands are used twice as much having one band in current use and one spare band, in accordance with the present invention, the bands become to be efficiently utilized, in addition to the use of the conventional method.

In case that for a plurality of bands in current use, there is one spare band, or in case that for a plurality of bands in current use, there are also a plurality of spare bands, the following methods can be applied: a method of allocating a spare band(s) in order of switching requirements from a signal in current use to the spares, a method of allocating a spare band(s) by giving priority to each signal in current use (a method in which if there are no excess spares and a switching request is issued from a signal in current use having high priority, the signal in current use is selected.), or a method of equally allocating a spare band(s) to the bands in current use that issued a switching request. Thereby, a switching can be realized, in which the spares are utilized efficiently. Also, in case that, for example, a spare band(s) is/are set so as to be equal or more than the bands in current use, the statistical multiplexing has not to be applied. However, it is possible to set the spare band(s) to be less than the bands in current use by statistically multiplexing the spare band(s) in an ATM.

In this way, by taking account of accommodation to a wide switching method, for example, by taking account of the protection of spare bands m for bands n in current use, a protection method in wide use can be provided.

Next, embodiments of the present invention are described.

Figure 2:
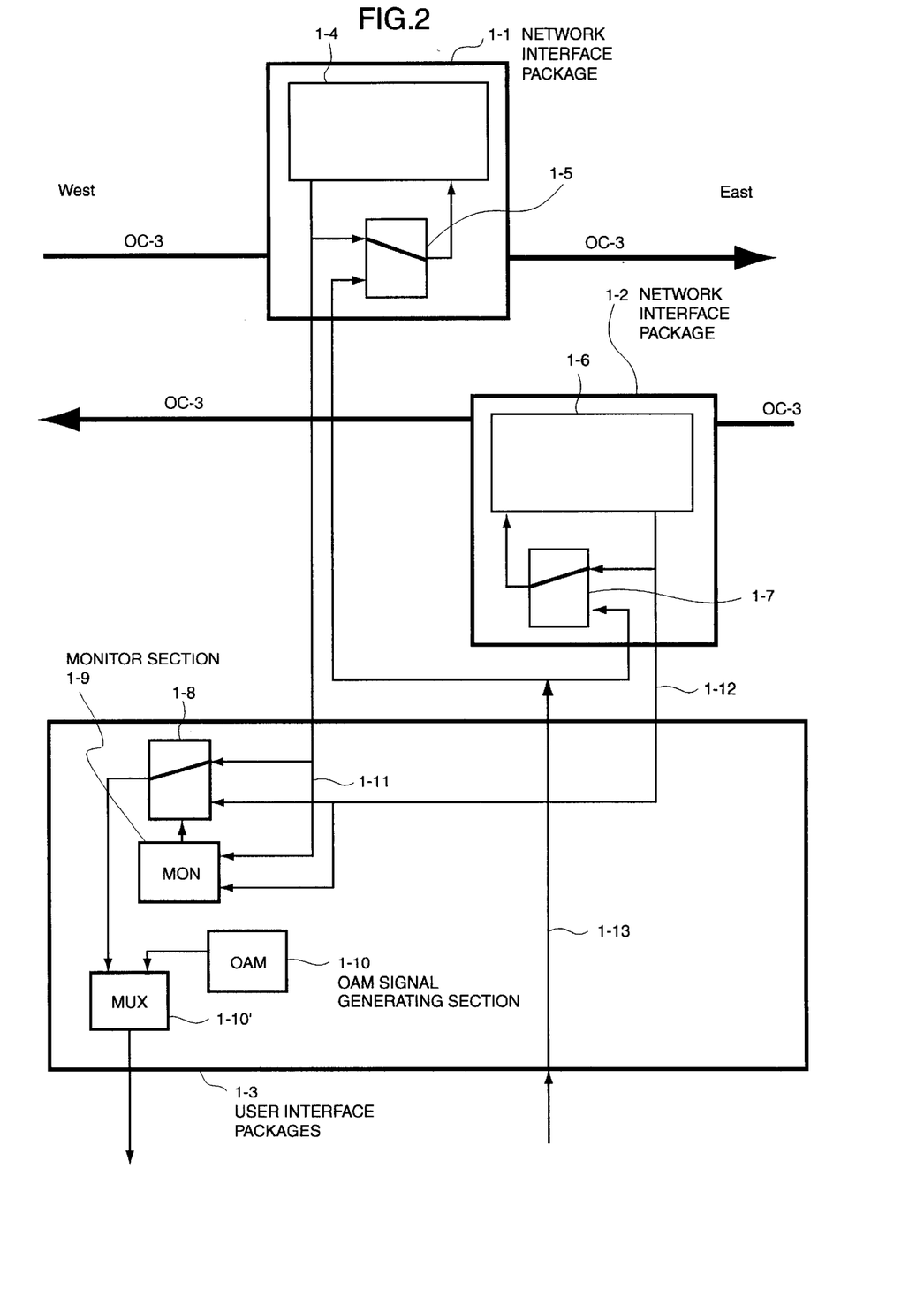
FIG. 2 is a block diagram showing a first embodiment of the present invention.

A first embodiment of the present invention is shown in FIG. 2. Although, in this embodiment, a example in an ATM is shown, basically the same conception is applied to an STM.

As shown in the figure, a system in this embodiment is constructed by a network interface package (an aggregate side package) 1-1 for receiving an OC-3 signal from a West side and transmitting the signal to an East side, a network interface package (an aggregate side package) 1-2 for receiving an OC-3 signal from the East side and transmitting the signal to the West side, and a plurality of user interface packages (tributary packages) 1-3. In FIG. 2, only one user interface packages 1-3 is shown.

The network interface package 1-1 has a selection portion 1-5 for selecting whether the OC-3 signal from the West side passes through and goes to the East side or a signal 1-13 from a subordinate device side is added to the OC-3 signal from the West side, and a multiplexing/separating portion 1-4 for transmitting and receiving signals to and from the plurality of user interface packages 1-3 and unifying the signals to one OC-3 signal. The network interface package 1-2 has a selection portion 1-7 for selecting whether the OC-3 signal from the East side passes through and goes to the West side or the signal 1-13 from the subordinate device side is added to the OC-3 signal from the East side, and a multiplexing/separating portion 1-6 for transmitting and receiving signals to and from the plurality of user interface packages 1-3 and unifying the signals to one OC-3 signal.

The user interface packages 1-3 have a monitor portion (MON) 1-9 for monitoring normality of a signal 1-11 that was dropped at the multiplexing/separating portion 1-4 from the OC-3 signal from the West side and a signal 1-12 that was dropped at the multiplexing/separating portion 1-6 from the OC-3 signal from the East side, a selection portion 1-8 for, based on a monitoring result by the monitor portion 1-9, selecting a signal closer to normality out of the signals 1-11 and 1-12 as a selected signal, an OAM signal generating portion 1-10 for generating an OAM signal to the subordinate device (user interface) side, and an OAM inserting portion (MUX) 1-10' for inserting the OAM signal into the selected signal. Here, although a 2 to 1 type of selector for selecting one of two signals is described as an example of the selection portion 1-8, as described in detail afterward, it is also possible to compare more than three signals of candidates in parallel with each other and select a signal that operates most normally.

Also, as shown in the figure, at a backboard (a board for connecting packages to each other), the signal 1-13 from the user interface packages 1-3 on the tributary side is divided so as to send entirely the same divided signals to the network interface packages 1-1 and 1-2 on the aggregate side. Thereby, the necessity of providing respective individual lines to the network interface packages 1-1 and 1-2 from the user interface packages 1-3 can be eliminated by using one kind of signal.

In FIG. 2, two kinds of signals 1-11 and 1-12 are input between the network interface packages 1-1 and 1-2 and the user interface packages 1-3. In this case, if a simple multiplexor (in case of an ATM, a cell multiplexor) for multiplexing the two kinds of signals into one signal is disposed between the network interface packages 1-1 and 1-2 and the user interface packages 1-3, it is possible to make the input to the user interface packages 1-3 to be one.

This conception can be applied to a case of handling more than three signals in entirely the same manner.

Thereby, for a signal passing through a node without being added or dropped, a signal processing can be closed within a package or an LSI, and the necessity for exchange of signals with other packages or LSI s is eliminated, thereby, resulting in making efficiency of the signal processing to be improved, and the number of pins of the LSI's and packages or a wiring of the backboard can be minimized. Therefore, high reliability, compactness and low cost performance of an apparatus can be achieved and occurrence of unnecessary noise can be prevented.

By comparing two (or more than two) signals of a signal in current use and a spare signal with each other and selecting a signal, since each user interface package 1-3 on the tributary side independently monitors the two (or more than two) individual signals and selects one signal from them, the apparatus can be easily implemented by a hardware logic, resulting in making the apparatus compact. Since this makes each user interface package 1-3 have a selecting function in an autonomous distributed manner, a fast switching can be executed regardless of the number of objects to be switched. Also, simplification of a circuit makes an apparatus with high reliability to be realized, in addition to promoting low cost performance.

In order to make a fine switching per unit of a VP and VC possible, protection at an ATM layer is conducted. This can be realized by conducting notification of a failure or a switching at a VP or VC level of a user cell or an OAM cell. Also, on the execution of the switching, a switch is equipped so as to execute the switching per VP unit or VC unit. For this, in FIG. 2 for example, by making the multiplexing/separating portions 1-4 and 1-6 of the network interface packages 1-1 and 1-2 have a function for inserting the OAM cell together, it is possible to conduct the notification of a failure using the OAM cell. There is a method in which the user cell is used instead of the OAM cell. Also, in this case, every switching is executed per VP unit or VC unit.

As shown in FIG. 2 and the aforementioned JP-A-107425/1996, it is also possible that the OAM signal generating portion 1-10 and the OAM inserting portion (MUX) 1-10' are constructed so as to be able to insert the OAM signal such as an IDLE signal and an AIS signal into the dropped signal 1-11 or 1-12 in each user interface package 1-3.

Figure 3:
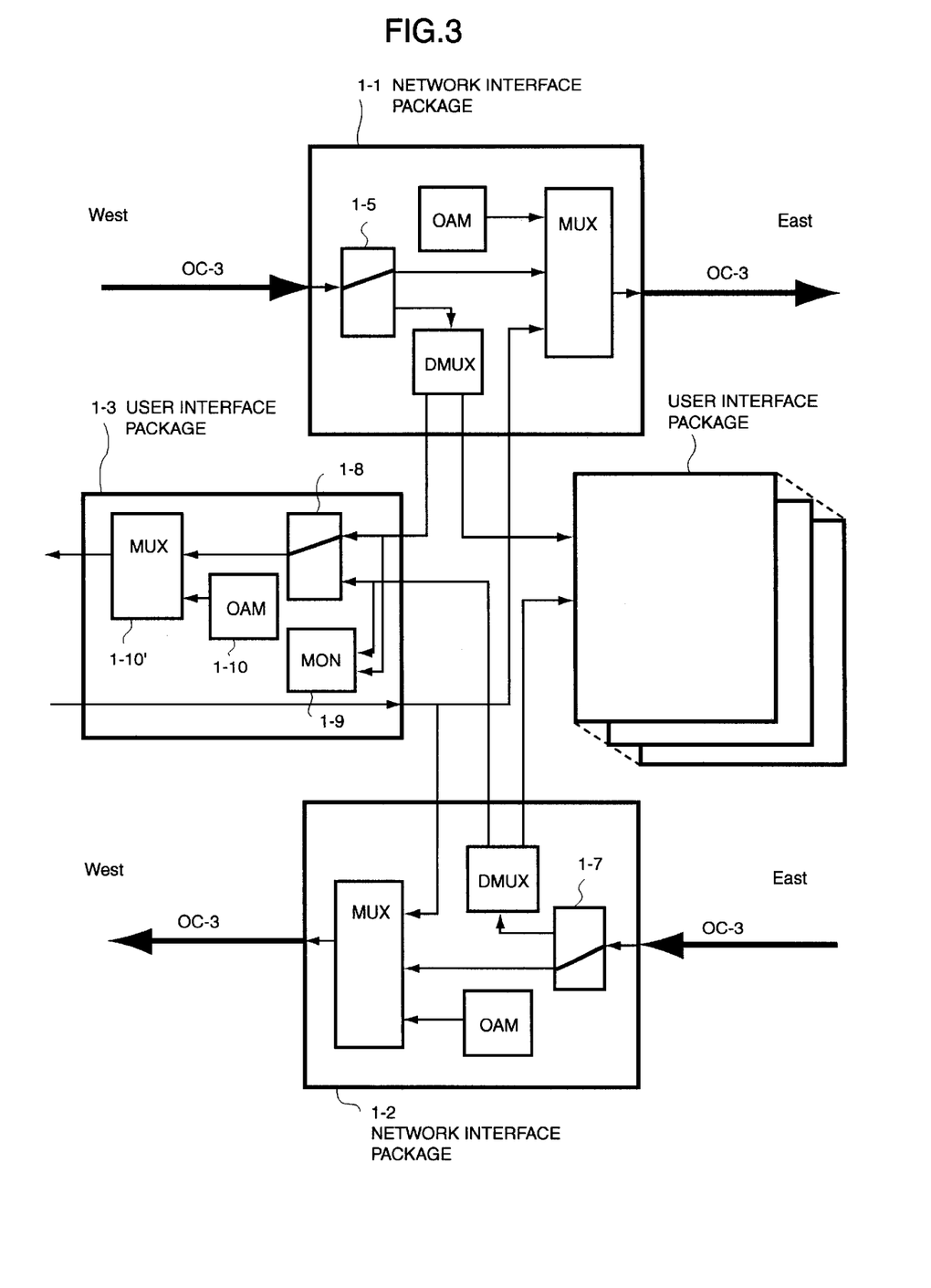
FIG. 3 is a block diagram showing a modified example of the apparatus of FIG. 2.

An apparatus shown in FIG. 3 is the same as the apparatus of FIG. 2 except the following points: In the apparatus of FIG. 3, each of the multiplexing/separating portions 1-4 and 1-6 (FIG. 2) of the network interface packages 1-1 and 1-2, which have the function for inserting the OAM cell, is constructed by an OAM cell generating portion (OAM), a multiplexing portion (MUX), and a separating portion (DMUX). Also, in FIG. 3, a plurality of user interface packages 1-3 are shown.

Figure 4:
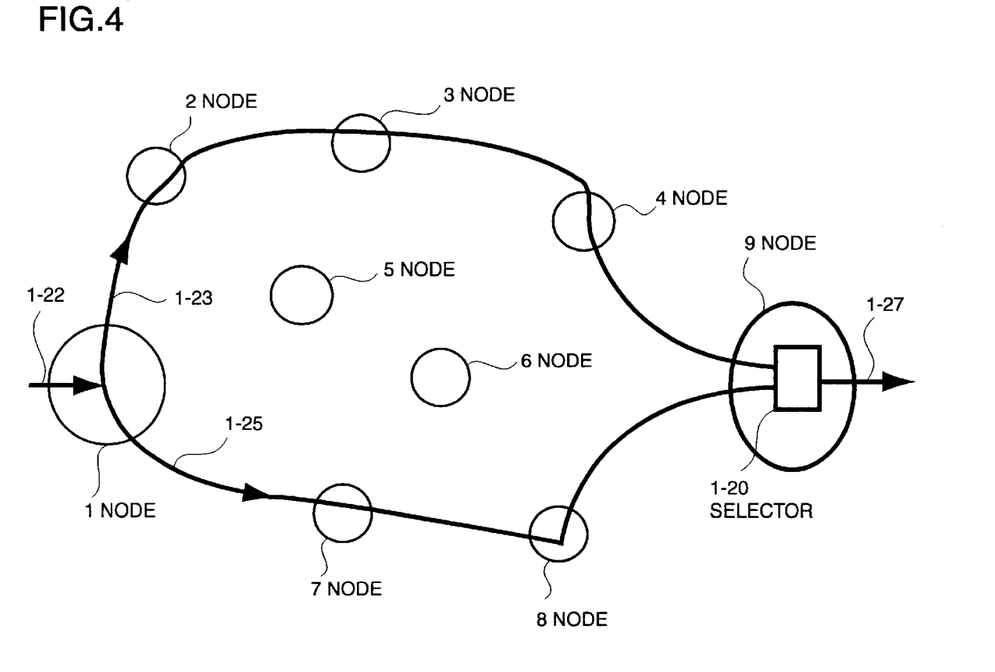
FIG. 4 is a block diagram illustrating a principle of the present invention.
Figure 5:
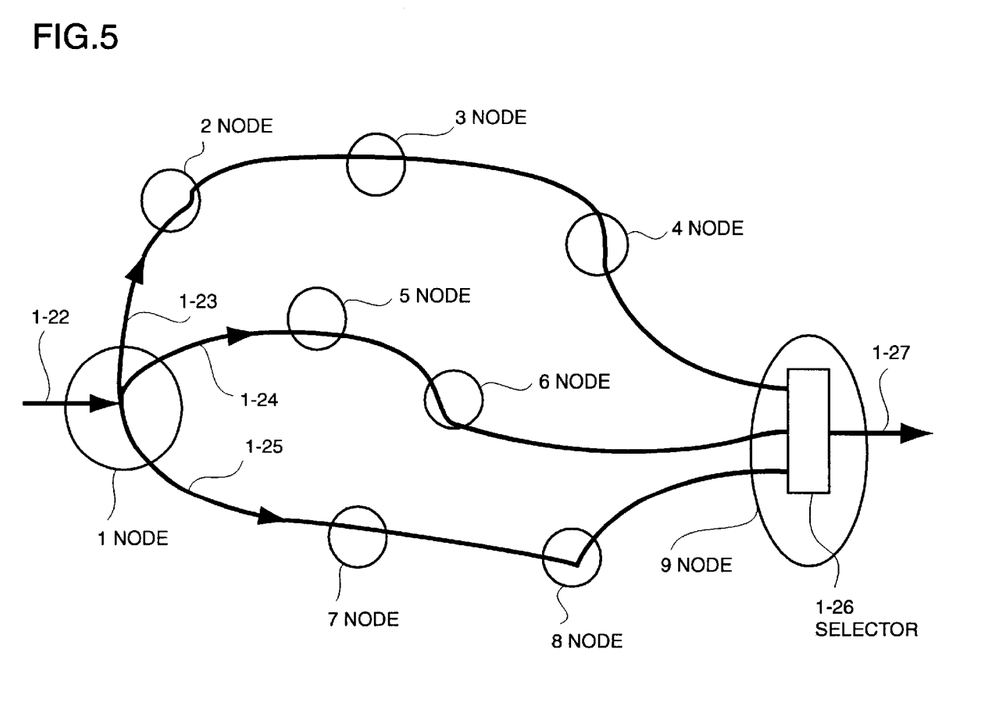
FIG. 5 is a block diagram showing a second embodiment of the present invention.

By referring to FIGS. 4 and 5, a second embodiment will be explained, which can be adapted to a topology such as a mesh topology, other than a ring topology. In accordance with the embodiment, the present invention provides a protection method or apparatus in wide use, of which application is not limited to the ring topology. As mentioned above, for example, in the conventional UPSR adapted to the ring topology, with respect to objects to be compared with in a switching, it is assumed that for one in current use, the spare is also one. However, in taking the mesh topology into account, it can be considered that for one in current use, there are more than two spares, that is, a plurality of spares. This can be solved by, as shown in FIG. 5, using a selector (in the figure, a 3 to 1 selector is illustrated) 1-26 for comparing more than three signals of candidates in parallel with each other and selecting a signal that operates most normally as a selected signal 1-27, regardless of, as shown in FIG. 4, using a selector (a 2 to 1 selector) 1-20 for selecting one signal of two signals on a reception side as a selected signal 1-27. Thereby, a switching method or apparatus capable of being also adapted to the mesh topology can be implemented and more high reliability can be realized. In addition, in FIGS. 4 and 5, a reference numeral 1-22 denotes a signal that is input to a node 1, a reference numeral 1-23 denotes a signal that is divided from the node 1 and goes to a node 2, a reference numeral 1-24 denotes a signal that is divided from the node 1 and goes to a node 5, and a reference numeral 1-25 denotes a signal that is divided from the node 1 and goes to a node 7.

Figure 6:
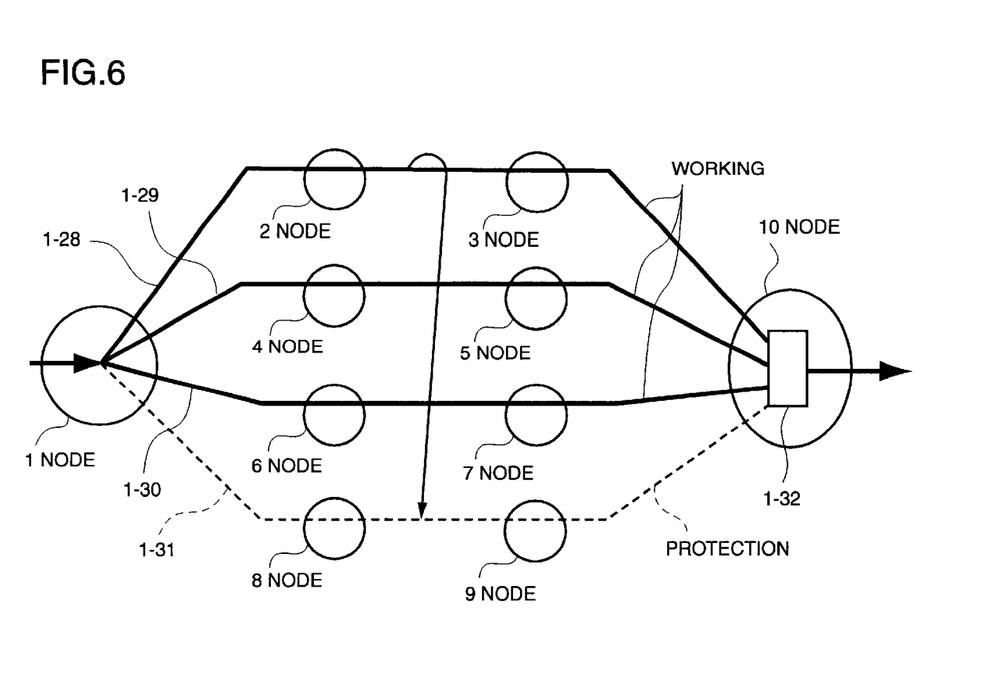
FIG. 6 is a block diagram showing a third embodiment of the present invention.

As shown in FIG. 6, in case that for a plurality of (working) signals 1-28, 1-29 and 1-30 in current use, there are spares (protection) 1-31, or in case that for a plurality of signals in current use, there are also a plurality of spares, the following methods can be applied:

(1) a method of allocating spares in order of switching requirements from a signal in current use to the spares, (2) a method of allocating the spares by pre-giving priority to each signal in current use (a method in which if there are no excess spares and a switching request is issued from a signal in current use having high priority, the signal in current use is selected.), (3) a method of appropriately allocating the spares within a spare band thereof to be provided to the bands in current use that issued a switching request, and making the bands to be shared (In this case, of course, 100% of bands cannot be ensured.), and so forth. In this case, the spare signal 1-31 for the signals 1-28, 1-29 and 1-30 in current use is allocated after a failure occurs in the signals in current use. The above-mentioned (1) and above-mentioned (2) are the methods that can be used for an STM and an ATM. However, the above-mentioned (3) is the method that can be used only for the ATM, because control of the bands is required. In addition, a selector 1-32 acts as a 1 to n (1:n) switch for selecting one signal that operates most normally as a selected signal 1-27 in case that for n (=3) signals in current use, there is one spare signal.

Thereby, a switching can be realized, in which the spares are utilized efficiently.

In this way, by taking account of accommodation to a wide switching method, for example, by taking account of the protection of spare bands m for bands n in current use, a protection method in wide use can be provided.

Figure 7:
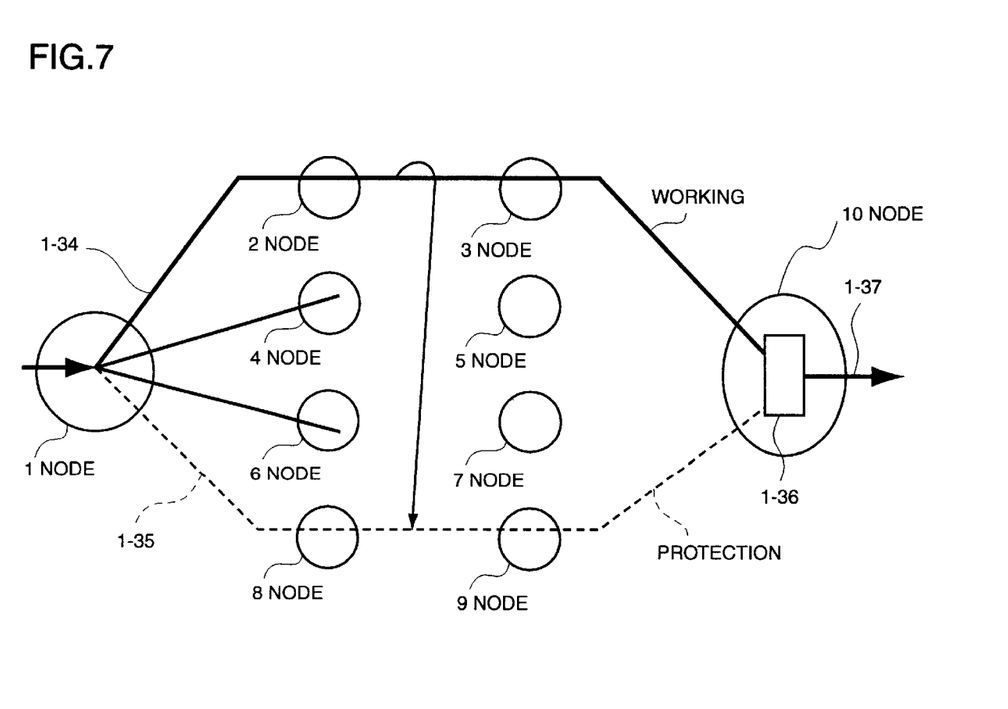
FIG. 7 is a block diagram showing a fourth embodiment of the present invention.

As shown in FIG. 7, in the present invention, a band is efficiently used by statistically multiplexing a plurality of signals "in current use" by using an ATM. FIG. 7 shows an example in which the signals in current use are statistically multiplexed. A reference numeral 1-34 denotes a signal in which the signals 1-28, 1-29 and 1-30 in current use in FIG. 6 are statistically multiplexed, a reference numeral 1-35 denotes a spare signal for the signal 1-34, and a reference numeral 1-36 denotes a selector that has a function as a 1 to 1 (1:1) selector for selecting one signal in case that for one signal in current use, there is one spare signal, and a separating function for separating a selected and statistically multiplexed signal and outputting the separated signal 1-37.

In this case, since the signals in current use are statistically multiplexed, bands in current use can be efficiently used. However, due to conducting the statistical multiplexing, a cell loss can occur in case that a failure does not occur in the signals in current use.

Figure 8:
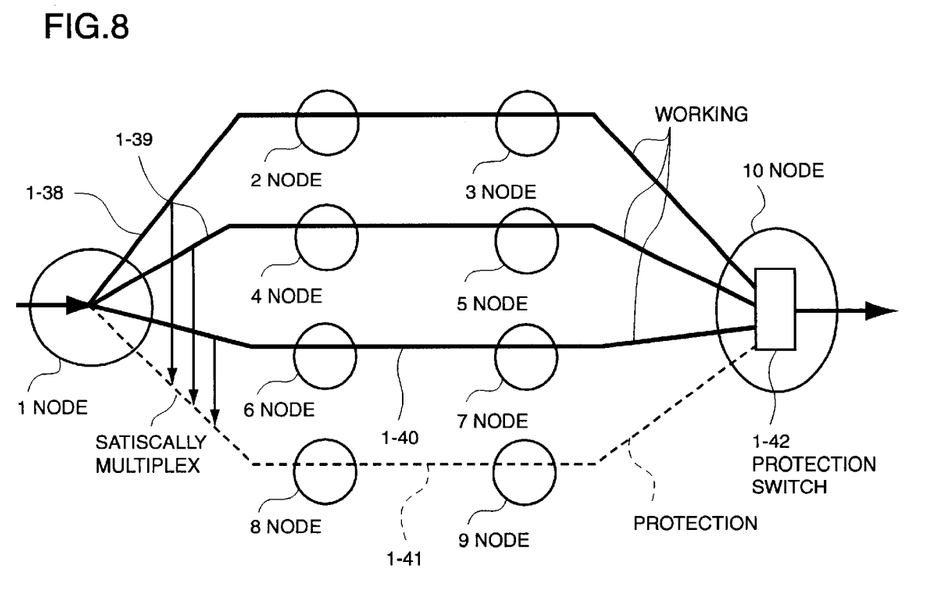
FIG. 8 is a block diagram showing a fifth embodiment of the present invention.

As shown in FIG. 8, in the present invention, in order to prevent the cell loss, an advantage of the statistical multiplexing is effected by focussing a spare band. In case that a spare band(s) is/are set so as to be equal or more than the bands in current use, the statistical multiplexing has not to be applied. However, it is possible to set the spare band(s) to be less than the bands in current use by statistically multiplexing the spare band(s) in an ATM. In this figure, a plurality of individual routes 1-38, 1-39 and 1-40 in current use exist independently, and a spare route 1-41 for the case that a failure occurs in the routes in current use is prepared by statistically multiplexing the plurality of routes for current use. By using this method, since the individual routes in current use exist independently, it makes transmission to be realized without any cell loss during normal operation. During abnormal operation, since the plurality of routes in current use are shared by the statistical multiplexing, the spare band(s) can be reduced, resulting in efficient utilization of source. In this case, due to the statistical multiplexing on the spare side, there is a possibility of occurrence of the cell loss. However, how spare source is efficiently used or how a failure is restored while accepting the cell loss in case of being switched to the spares can be freely changed by a set of a band of the spares. In addition, a reference numeral 1-42 denotes a protection switch that has a function as a 3 to 1 (3:1) switch for selecting one signal in case that for three signals in current use, there is one spare signal, and a separating function for, in case that the selected signal is statistically multiplexed, separating the signal.

Figure 9:
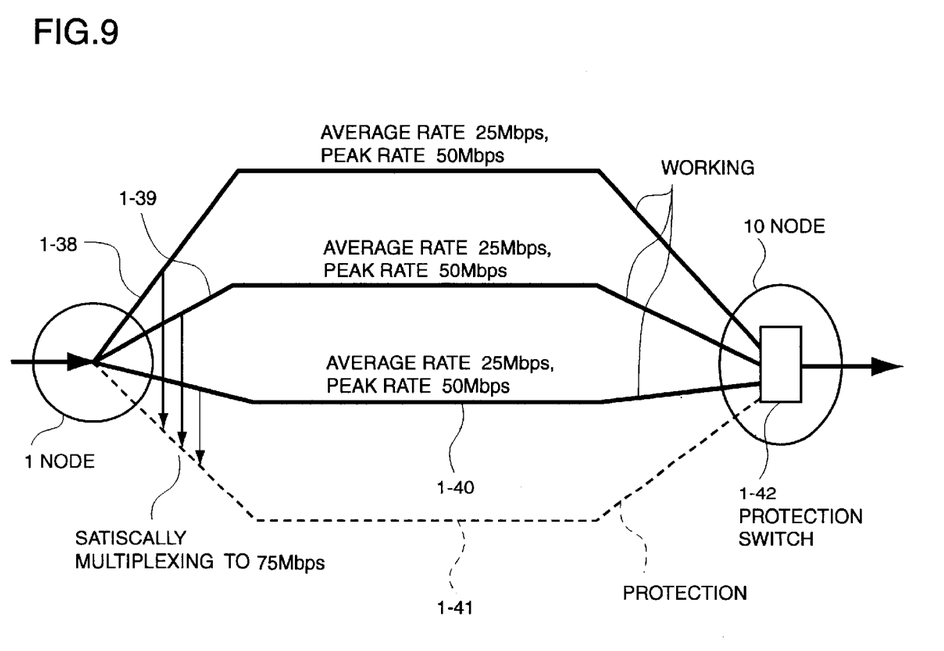
FIG. 9 is a block diagram showing an example of the implementation of the apparatus of FIG. 8.

In FIG. 9, a concrete example of FIG. 8 is shown. There are three signals 1-38, 1-39 and 1-40 in current use that have entirely the same bands, respectively, and it is assumed that an average rate of each of the signals 1-38, 1-39 and 1-40 in current use is 25 Mbps and that a peak rate thereof is 50 Mbps. A spare band of 75 Mbps is prepared for the three signals 1-38, 1-39 and 1-40 in current use, and a spare signal 1-41 of 75 Mbps is being always transmitted to a spare route, which is formed by statistically multiplexing the three signals 1-38, 1-39 and 1-40 in current use. In case that a failure does not occur, it is possible to independently transmit the respective signals in current use. If a failure occurs in one signal of the three signals in current use, the failure can be restored by separating a spare signal transmitted through a spare line in which the signals in current use are statistically multiplexed, and switching the signal with the failure to the spare signal.

However, as mentioned above, since the signal input through the spares is one to which the statistical multiplexing has been applied, 100% signal is not ensured. In other words, if the three signals are input in a band of 50 Mbps concurrently in a burst manner beyond an acceptable region, it results in 150 Mbps. In this case, a cell loss occurs in the spare line.

However, in this method, by individually allocating the spare bands to the three signals, how a failure can be restored can be freely changed. For example, in this case, the spare band of 50 Mbps is allocated to one important signal in current use and the remaining spare bands of 25 Mbps are allocated to the remaining three signals, thereby if the important signal in current use is switched to the spare signal, the signal can be transmitted without a cell loss. Also, if the spare band is set to 150 Mbps, since for one in current use there is one for spare use, of course, a cell loss cannot occur in any signal in current use. That is, a network can be freely designed under tradeoff of a design without the cell loss and a design using a spare band efficiently.

By handling the ATM layer in this manner, the protection at the ATM layer per unit of the VP or VC can be conducted, and restricted source can be efficiently used by statistically multiplexing signals on a side in current use or signals on a spare side. Particularly, by using a method in which a restricted band of the spares is shared with a plurality of bands in current use and utilized, the spare band that is not usually used can be used efficiently. Although conventionally, there was a method, for example, in which bands are used twice as much having one spare band for one band in current use, in accordance with the present invention, the bands become to be efficiently utilized, in addition to the use of the conventional method.

As mentioned so far, in accordance with the present invention, the problem that in case that a lot of control commands of a switching occur concurrently, the switching spends much time can be avoided, and the problem that reliability becomes to be extremely lowered due to the necessity of a switch having a complicated circuit can be avoided. Since for a signal passing through a node without being added or dropped, a signal processing can be closed within a physical processing medium such as a package and an LSI, and since a removal of unnecessary exchange of signals with other LSI's and packages, efficiency can be much improved. Thereby, since the number of pins of the packages or LSI's, or a wiring of a backboard can be saved, low cost performance of an apparatus can be achieved and occurrence of unnecessary noise can be also prevented. Further, by concurrently distributing a switching function everywhere in an autonomous distributed manner, an advantage can be effected that a fast switching can be realized by a compact means at low cost and high reliability can be realized.

Since the present invention can be applied to the case that for one in current use, there are a plurality of spares, including accommodation to a mesh topology and so forth, flexibility of its accommodation and high reliability can be realized. Also, by taking account of accommodation to a wide switching method, for example, by taking account of the protection of spare bands m for bands n in current use, a protection method in wide use can be provided.

Also, the present invention can realize not only protection at the ATM layer and a fine switching per unit of a VP or VC but also efficient utilization of bands in current use and spare bands by utilizing a statistical multiplexing effect that is characteristic of the ATM. Thereby, restricted bands of the spares can be shared with a plurality of bands in current use and utilized, resulting in effecting an advantage that the "spare bands" which are not usually used can be used efficiently.

The entire disclosure of Japanese Patent Application No. 9-019390 filed on Jan. 31, 1997 including specification, claims, drawing and summary are incorporated herein by reference in its entirety.

What is claimed is:

1. A signal switching method comprising the steps of:
    (a) dividing signals to be switched into a plurality of divided signals;
    (b) outputting said plurality of divided signals at a transmittal terminal;
    (c) receiving said plurality of divided signals as a plurality of receiving signals at a reception terminal;
    (d) passing through or dropping said plurality of receiving signals at said reception terminal, or adding a signal, wherein said plurality of receiving signals that pass through said reception terminal are processed in a closed manner within one package or LSI; and
    (e) selecting a signal closer to normality out of said plurality of receiving signals.

2. A signal switching method of executing a switching to a spare route from a plurality of routes in current use, comprising the steps of:
    (a) inputting a plurality of signals into said plurality of routes in current use, said plurality of signals being obtained by dividing input signals; and
    (b) switching said plurality of signals in order of switching requirements of said plurality of routes in current use, wherein a number of or band of said spare route is less than that of said plurality of routes in current use; and
    (c) selecting a signal closer to normality out of said plurality of signals.

3. A signal switching method of executing a switching to a spare route from a plurality of routes in current use, comprising the steps of:
    (a) inputting a plurality of signals into said plurality of routes in current use, said plurality of signals being obtained by dividing input signals; and
    (b) switching said plurality of signals in said plurality of routes in current use to said spare route based on a preset priority of said plurality of routes in current use, wherein a number of or band of said spare route is less than that of said plurality of routes in current use; and
    (c) selecting a signal closer to normality out of said plurality of signals.

4. A signal switching method of executing a switching to a spare route from a plurality of routes in current use in an ATM network, comprising the steps of:
    (a) inputting a plurality of signals into said plurality of routes in current use, said plurality of signals being obtained by dividing input signals;
    (b) allocating said plurality of routes in current use and switching said plurality of routes in current use to a number of or band of said spare route, wherein a number of or band of said spare route is less than that of said plurality of routes in current use;
    (c) sharing the number of or band of said spare route; and
    (d) selecting a signal closer to normality out of said plurality of signals.

5. A signal switching method of executing a switching to a spare route from a plurality of routes in current use in an ATM network, comprising the steps of:
    (a) inputting a plurality of signals into said plurality of routes in current use, said plurality of signals being obtained by dividing input signals;
    (b) statistically multiplexing said plurality of signals, and inputting said multiplexed signals to one of said plurality of routes in current use;
    (c) switching said one of said plurality of routes in current use containing said multiplexed signals to said spare route, wherein a number of or band of said spare route is less than that of said plurality of routes in current use; and
    (d) selecting and separating a signal closer to normality out of said multiplexed signals.

6. A signal switching method of executing a switching to a spare route from a plurality of routes in current use in an ATM network, comprising the steps of:
 (a) inputting a plurality of signals into said plurality of routes in current use, said plurality of signals being obtained by dividing input signals;
 (b) statistically multiplexing said plurality of signals; and
 (c) inputting said multiplexed signals to said spare route, wherein a number of or band of said spare route is less than that of said plurality of routes in current use; and
 (d) selecting and separating a signal closer to normality out of said multiplexed signals.

7. A signal switching apparatus comprising:
 (a) means for dividing signals to be switched into a plurality of divided signals;
 (b) means for outputting said plurality of divided signals at a transmittal terminal;
 (c) means for receiving said plurality of divided signals as a plurality of receiving signals at a reception terminal; and
 (d) means for passing through or dropping said plurality of receiving signals at said reception terminal, or adding a signal, wherein said plurality of receiving signals that pass through said reception terminal pass through in a closed manner within one package or LSI; and
 (e) means for selecting a signal closer to normality out of said plurality of receiving signals.

8. A signal switching apparatus for executing a switching to a spare route from a plurality of routes in current use, comprising:
 (a) means for inputting a plurality of signals into said plurality of routes in current use, said plurality of signals being obtained by dividing input signals; and
 (b) means for switching said plurality of signals in order of switching requirements of said plurality of routes in current use, wherein a number of or band of said spare route is less than that of said plurality of routes in current use; and
 (c) means for selecting a signal closer to normality out of said plurality of signals.

9. A signal switching apparatus for executing a switching to a spare route from a plurality of routes in current use, comprising:
 (a) means for inputting a plurality of signals into said plurality of routes in current use, said plurality of signals being obtained by dividing input signals; and
 (b) means for switching said plurality of signals in said plurality of routes in current use to said spare route based on a preset priority of said plurality of routes in current use, wherein a number of or band of said spare route is less than that of said plurality of routes in current use; and
 (c) means for selecting a signal closer to normality out of said plurality of signals.

10. A signal switching apparatus for executing a switching to a spare route from a plurality of routes in current use in an ATM network, comprising:
 (a) means for inputting a plurality of signals into said plurality of routes in current use, said plurality of signals being obtained by dividing input signals;
 (b) means for allocating said plurality of routes in current use and switching said plurality of routes in current use to a number of or band of said spare route, wherein a number of or band of said spare route is less than that of said plurality of routes in current use; and
 (c) means for sharing the number of or band of said spare route; and
 (d) means for selecting a signal closer to normality out of said plurality of signals.

11. A signal switching apparatus for executing a switching to a spare route from a plurality of routes in current use in an ATM network, comprising:
 (a) means for inputting a plurality of signals into said plurality of routes in current use, said plurality of signals being obtained by dividing input signals;
 (b) means for statistically multiplexing said plurality of signals, and inputting said multiplexed signals to one of said plurality of routes in current use; and
 (c) means for switching said one of said plurality of routes in current use containing said multiplexed signals to said spare route, wherein a number of or band of said spare route is less than that of said plurality of routes in current use; and
 (d) means for selecting and separating a signal closer to normality out of said multiplexed signals.

12. A signal switching apparatus for executing a switching to a spare route from a plurality of routes in current use in an ATM network, comprising the steps of:
 (a) means for inputting a plurality of signals into said plurality of routes in current use, said plurality of signals being obtained by dividing input signals;
 (b) means for statistically multiplexing said plurality of signals;
 (c) means for inputting said multiplexed signals to said spare route, wherein a number of or band of said spare route is less than that of said plurality of routes in current use; and
 (d) means for selecting and separating a signal closer to normality out of said multiplexed signals.

13. A signal switching method according to claim 1, wherein for said plurality of receiving signals that are dropped at said reception terminal, transferring said dropped signals to a package or LSI on a dropped side, and selecting a signal closer to normality, said signal closer to normality selected from said dropped signals.

14. A signal switching method according to claim 1, wherein said signal to be added is divided in a package or LSI on an added side into equivalent divided signals, and said equivalent divided signals are sent to differing routes.

15. A signal switching method according to claim 1, wherein said dropped signals at said reception terminal node are multiplexed and input into a package or LSI.

16. A signal switching apparatus according to claim 7, wherein for said plurality of receiving signals that are dropped at said reception terminal node, means are provided for transferring said dropped signals to a package or LSI on a dropped side, and selecting a signal closer to normality, said signal closer to normality selected from said dropped signals.

17. A signal switching apparatus according to claim 7, wherein for said signal to be added, means are provided for dividing at a backboard a signal from a package or LSI on an added side into equivalent divided signals, so that said equivalent divided signals are sent to differing routes.

18. A signal switching apparatus according to claim 7, wherein for said dropped signals at said reception terminal, means are provided for multiplexing and inputting said multiplexed signals into a package or LSI.

* * * * *